United States Patent [19]
Ostlie

[11] Patent Number: 5,853,467
[45] Date of Patent: Dec. 29, 1998

[54] SPRAYABLE SURFACE DEFECT DETECTION COMPOSITION AND METHOD OF USING SAME

[75] Inventor: Brian W. Ostlie, Woodbury, Minn.

[73] Assignee: Minnesota Mining & Manufacturing Co., St. Paul, Minn.

[21] Appl. No.: 941,494

[22] Filed: Sep. 30, 1997

[51] Int. Cl.⁶ ................................ B05D 7/14; C09D 5/00
[52] U.S. Cl. .................................. 106/31.28; 106/31.35; 106/31.6; 106/31.85; 106/287.17; 106/419
[58] Field of Search ................................ 106/287.17, 419, 106/31.27, 31.6, 31.28, 31.35, 31.85

[56] References Cited

U.S. PATENT DOCUMENTS 5,175,203  12/1992  Kansupapa et al. .................... 524/399

FOREIGN PATENT DOCUMENTS

| | | |
|---|---|---|
| 1078733 | 11/1993 | China . |
| 59-036122 | 2/1984 | Japan . |
| 63-012378 | 1/1988 | Japan . |
| WO 95/08405 | 3/1995 | WIPO . |

OTHER PUBLICATIONS

ASTM D3539–87 Standard Test Methods for Evaporation Rates of Volatile Liquids by Shell Thin–Film Evaporometer, 1996.

*Primary Examiner*—Erma Cameron
*Attorney, Agent, or Firm*—Janice L. Dowdall

[57] ABSTRACT

This invention relates to a sprayable guide coat composition for use in the detection of defects on surfaces and its method of use in surface finishing processes. The composition contains anti-loading agents which improve abrasive cut and life of the abrasive article (such as sandpaper) that it is used in conjunction with. The composition also improves quality and speed of removing surface defects by providing a fast drying coating.

20 Claims, No Drawings

SPRAYABLE SURFACE DEFECT DETECTION COMPOSITION AND METHOD OF USING SAME

FIELD OF THE INVENTION

This invention relates to a sprayable guide coat composition for use in the detection of defects on surfaces and its method of use in surface finishing processes. The composition contains anti-loading agents which improve the abrasive cut and life of the abrasive article (such as sandpaper) that it is used in conjunction with. The composition also improves quality and speed of removing surface defects by providing a fast drying coating.

BACKGROUND OF THE INVENTION

Surface finishing processes, particularly repair processes in the automotive refinish industry, involve the application of fillers to imperfections in the surface followed by progressive abrasion with coarser to finer abrasive materials until the desired smooth surface is achieved. A series of protective coatings is applied, e.g., primer, sealers, base coats, clear coats, and so forth, and each layer is normally abraded prior to application of the next coat in order to ensure a smooth surface. A smooth surface is obtained by preferentially abrading high spots until a uniform flat aesthetically pleasing surface is obtained.

In order to assist the operator in identifying areas requiring abrasion and highlighting defects during the repair process, it is known to apply a guide coat to the surface being abraded. The guide coats generally comprise a dilute paint mixture which are sprayed over the surface to be abraded providing a light paint coating. As the surface is abraded, the guide coat is removed from the higher portions of the surface leaving the visible guide coat on the lower areas. Thus, the surface irregularities are clearly visible to the operator, enabling the operator to abrade and fill the appropriate areas to achieve a flat high quality repair.

Various current guide coats are applied as thin coatings of liquid paint which must dry or cure before the sanding operation. Aerosol paints, which are commonly thermoplastic lacquer based materials, are convenient to use and dry quickly when compared to automotive paints or primers when used as guide coats. However, thermoplastic materials tend to load the abrasive disc during the sanding operation which decreases cut rate and disc life compared to crosslinked thermoset materials. Disadvantages of crosslinked paints or primers when used as guide coats are that they are usually multi-component, higher solids, slower drying and less convenient compared to the aerosol products.

WO 95/08405 discloses a guide coat formed on a surface as part of a smoothing operation e.g., of vehicle bodywork by distributing finely divided particulate material, e.g., a non-toxic, black powdered paint over the surface so the material remains on and thus highlights any irregularities on the surface. The material may be wiped onto the surface by an applicator e.g., synthetic foam or sponge impregnated with the material. The material may be stored in a container in a loose finely divided form or in a compact substantially solid form from which finely divided particles may be removed. The majority of the material is subsequently removed from the surface as this surface is abraded to remove the highlighted irregularities.

SUMMARY OF THE INVENTION

The present invention overcomes many of the disadvantages of known aerosol and chemically crosslinked paint guide coats. The present invention substantially minimizes abrasive disc loading and substantially increases abrasive performance over the life of the disc.

The present invention provides a composition comprising:
 (a) a solvent(s) having an evaporation rate of at least about 0.5 when measured at a temperature of 25° C., wherein if more than one solvent is used, the solvents are miscible with each other;
 (b) at least about 0.001 percent by weight of a component selected from the group consisting of solvent dispersible pigments, solvent soluble dyes, and mixtures thereof; and
 (c) at least about 1 percent by weight of an antiloading agent(s);
wherein the weight percentages are based upon the total weight of the composition, and wherein the composition has a Brookfield viscosity of less than about 15,000 centipoise, and
wherein the composition is capable of drying within five minutes or less upon coating on a substrate.

In a preferred embodiment the composition of the invention comprises:
 (a) about 60 to about 99 percent by weight of a solvent(s) having an evaporation rate of at least about 0.5 to about 20 at a temperature of 25 degrees C., wherein if more than one solvent is used, the solvents are miscible with each other;
 (b) about 0.01 to about 20 percent by weight of a component selected from the group consisting of solvent dispersible pigments, solvent soluble dyes, and mixtures thereof; and
 (c) about 1 to about 50 percent by weight of an antiloading agent,
wherein the weight percentages are based upon the total weight of the composition, and wherein the composition has a Brookfield viscosity of about 10 to about 8,000 centipoise, and wherein the composition is capable of drying within five minutes or less upon coating on a substrate.

In an even more preferred embodiment the composition of the invention comprises:
 (a) about 70 to about 95 percent by weight of a solvent(s) having an evaporation rate of about 3 to about 15 when measured at a temperature of 25° C., wherein if more than one solvent is used, the solvents are miscible with each other;
 (b) about 0.1 to about 10 percent by weight of a component selected from the group consisting of solvent dispersible pigments, solvent soluble dyes, and mixtures thereof; and
 (c) about 5 to about 30 percent by weight of an antiloading agent,
wherein the weight percentages are based upon the total weight of the composition, and wherein the composition has a Brookfield viscosity of about 15 to about 5,000 centipoise, and wherein the composition is capable of drying within five minutes or less upon coating on a substrate.

In a most preferred embodiment the composition of the invention comprises:
 (a) about 80 to about 90 percent by weight of a solvent(s) having an evaporation rate of about 7 to about 10 when measured at a temperature of 25° C., wherein if more than one solvent is used, the solvents are miscible with each other;
 (b) about 0.1 to about 5 percent by weight of a component selected from the group consisting of solvent dispersible pigments, solvent soluble dyes, and mixtures thereof;

(c) about 10 to about 20 percent by weight of an antiloading agent, wherein the weight percentages are based upon the total weight of the composition, and wherein the composition has a Brookfield viscosity of about 20 to about 2,500 centipoise, and wherein the composition is capable of drying within five minutes or less upon coating on a substrate.

The present invention also provides an aerosol system comprising:

(i) a composition comprising:
(a) a solvent(s) having an evaporation rate of at least about 0.5 when measured at a temperature of 25° C., wherein if more than one solvent is used, the solvents are miscible with each other;
(b) at least about 0.001 percent of a component selected from the group consisting of solvent dispersible pigments, solvent soluble dyes, and mixtures thereof; and
(c) at least about 1 weight percent of an antiloading agent(s);

wherein the weight percentages of (a), (b), and (c) are based upon the total weight of the composition, and wherein the composition has a Brookfield viscosity of less than about 15,000 centipoise, and wherein the composition is capable of drying within five minutes or less upon coating on a substrate;

(ii) a propellant;

wherein the composition and propellant are present in sufficient amounts and combined in such a manner as to enable the composition to be aerosol spray applied to a substrate;

wherein a coating spray applied to a substrate via the aerosol system is capable of drying in about five minutes or less.

The present invention also provides a method of sanding a substrate comprising the steps of:

(a) providing an aerosol system comprising:
(i) a composition comprising
(A) a solvent(s) having an evaporation rate of at least about 0.5 when measured at a temperature of 25° C., wherein if more than one solvent is used, the solvents are miscible with each other;
(B) at least about 0.001 percent of a component selected from the group consisting of solvent dispersible pigments, solvent soluble dyes, and mixtures thereof; and
(C) at least about 1 weight percent of an antiloading agent(s);

wherein the weight percentages are based upon the total weight of the composition, and wherein the composition has a Brookfield viscosity of less than about 15,000 centipoise, and wherein the composition is capable of drying within five minutes or less upon coating on a substrate; and (ii) a propellant;

wherein the composition and propellant are present in sufficient amounts and combined in such a manner as to enable the composition to be aerosol spray applied to a substrate;

wherein a coating spray applied to a substrate via the aerosol system is capable of drying in about five minutes or less;

(b) spray applying a coating to a substrate to be sanded via the aerosol system in order to form a coated substrate;

(c) allowing the coating to dry, wherein an amount and type of component of element (B) is present such that a color contrast visible to the naked eye exists between the coating and the substrate to be sanded;

(d) sanding the coated substrate over the dried coating;

(e) optionally repeating steps (b) to (d) one or more times.

Preferably the substrate to be sanded is selected from the group consisting of putty, primer, paint, wood, metal, plastic, and gelcoat.

DETAILED DESCRIPTION OF THE INVENTION

Properties of the Composition of the Invention

The composition of the present invention can also be referred to as a concentrate. Preferably the composition of the invention has a Brookfield viscosity of about 10 to about 8,000 centipoise, more preferably about 15 to about 5,000 centipoise, and most preferably about 20 to about 2,500 centipoise.

Preferably the composition of the invention is capable of drying in about three minutes or less upon coating on a substrate, more preferably in about one minute or less upon coating on a substrate, and most preferably about thirty seconds or less upon coating on a substrate.

Antiloading Agents

Examples of useful antiloading agent(s) which the composition can comprise include but are not limited to those selected from the group consisting of metallic stearates, metallic oleates, metallic octoates, and mixtures thereof.

Examples of preferred antiloading agent(s) are those selected from the group consisting of zinc stearate, calcium stearate, magnesium stearate, iron stearate, copper stearate, lithium stearate, sodium stearate, strontium stearate, aluminum stearate, barium stearate, potassium stearate, sodium oleate, aluminum octoate, and mixtures thereof The antiloading agent zinc stearate is particularly preferred.

Preferably the composition of the invention comprises about 1 to about 50 percent by weight of antiloading agent(s) based on the total weight of the composition. As antiloading agent is increased, sanding efficiency is typically improved to a point of diminishing returns. Above this point, excessive dust may be generated, cost of the composition can increase substantially, and the composition can become difficult to atomize or apply. More preferably the composition of the invention comprises about 5 to about 30 percent by weight of antiloading agent(s) based on the total weight of the composition. Most preferably the composition of the invention comprises about 10 to about 20 percent by weight of antiloading agent(s) based on the total weight of the composition for best balance of performance, dusting minimization, cost, and delivery.

These antiloading agents help prevent sanding swarf (sanding dust) from adhering to the surface of the coated abrasive article (such as a sanding disc) used in sanding over the guide coat of the invention. By minimizing the amount of swarf which adheres to the coated abrasive article, the abrasive particles' sharp edges are exposed to the substrate resulting in a faster cut rate and longer abrasive article life.

Solvent Soluble Dyes/Solvent Dispersible Pigments

The solvent soluble dye(s) selected should be soluble in the solvent(s) used according to the invention. The solvent dispersible pigment(s) selected should be dispersible in the solvent(s) used according to the invention. With respect to the composition of the invention, preferably the component of element (b) is a solvent soluble dye(s). Examples of useful specific solvent soluble dye(s) include but are not limited to those selected from the group consisting of diphenylmethanes, triphenylmethanes, acridines, xanthenes, quinoniiines, azines, oxazines, methylene, carotinoids, carbonyl, indigo, anthraquinone, stilbene, sulfur, and mixtures thereof Examples of use solvent dispersible pigments include but are not limited to the following: iron oxide, zinc oxide, and titanium dioxide.

At very low levels of dye(s)/pigment(s), imperfections become difficult to see. At high levels the composition can become messier to apply and more costly to produce. Preferably the composition of the invention comprises about 0.01 to about 20 percent by weight of a component selected from the group consisting of solvent dispersible pigments, solvent soluble dyes, and mixtures thereof, based upon the total weight of the composition.

More preferably the composition of the invention comprises about 0.1 to about 10 percent by weight of a component selected from the group consisting of solvent dispersible pigments, solvent soluble dyes, and mixtures thereof, based upon the total weight of the composition. Most preferably the composition of the invention comprises about 0.1 to about 5 percent by weight of a component selected from the group consisting of solvent dispersible pigments, solvent soluble dyes, and mixtures thereof, based upon the total weight of the composition, for reasons of easy identification of defects while being less messy and less costly.

Solvents

The composition of the present invention comprises a solvent(s) having an evaporation rate of at least about 0.5 when measured at a temperature of 25° C. as measured according to American Society for Testing and Materials (ASTM) D3539 (incorporated by reference herein), wherein if more than one solvent is used, the solvents are miscible with each other. Examples of useful solvent(s) include but are not limited to those selected from the group consisting of aliphatic hydrocarbons, aromatic hydrocarbons, chlorinated versions of the aforementioned, and mixtures thereof. Examples of preferred solvent(s) are those selected from the group consisting of ketones, alcohols, esters, chlorinated versions of the aforementioned, and mixtures thereof, for reasons of rapid evaporation and good solvating abilities. Most preferably the solvent(s) are selected from the group consisting of acetone, isopropanol, hexane, cyclohexane, toluene, methane, ethanol, methyl ethyl ketone, isobutylketone, heptane, and mixtures thereof, for reasons of rapid evaporation, solvency, and lesser likelihood of damage to the coated substrates.

Preferably the composition of the invention comprises about 60 to about 99 percent by weight of a solvent(s) based on the total weight of the composition for ease of application. The higher solvent content allows easier dispersion and delivery. More preferably the composition of the invention comprises about 70 to about 95 percent by weight of a solvent(s) based on the total weight of the composition. Most preferably the composition of the invention comprises about 80 to about 90 percent by weight of a solvent(s) based on the total weight of the composition for reasons of best delivery. When the amount of solvent is above about 90 percent by weight the amount of antiloading agent present in the composition can become lower which can decrease the sanding effectiveness of the abrasive article.

Preferably the solvent(s) have an evaporation rate of at least about 0.5 to about 20 at a temperature of 25 degrees C. as measured according to ASTM D3539 in order that the coating will dry more rapidly to avoid excessive waiting between application and sanding.

More preferably the solvent(s) have an evaporation rate of at least about 3 to about 15 at a temperature of 25 degrees C. as measured according to ASTM D3539. Most preferably the solvent(s) have an evaporation rate of at least about 7 to about 10 at a temperature of 25 degrees C. as measured according to ASTM D3539. If the evaporation rate is too high, the composition would be applied as a messy powder due to the solvent being evaporated before reaching the substrate during the spraying process.

Aerosol System

The level of propellant used as part of the aerosol system can vary. If the propellant level is too low the propellant may not adequately atomize the material for uniform application. If the propellant level is too high significant overspray onto surrounding areas can occur. Preferably the aerosol system comprises about 5 to about 50 percent by weight of the propellant, based upon the total weight of the composition plus the propellant, more preferably about 10 to about 30 percent by weight of the propellant, based upon the total weight of the composition plus the propellant, and most preferably about 15 to about 25 percent by weight of the propellant, based upon the total weight of the composition plus the propellant.

Preferably the propellant is selected from the group consisting of alkanes, alkenes, and chlorofluorocarbons and compressed gases such as nitrogen, carbon dioxide and nitrous oxide. Most preferably the propellant is selected from the group consisting of propane and isoheptane.

The propellant can be combined with the composition according to procedures known to those skilled in the art to form an aerosol. It may be intermixed therewith as one example, but may instead be in a separate compartment of a container, for example.

Binder Resins

With the present invention it is not necessary to include a binder resin. Preferably the composition of the invention comprises about 0 to about 10 weight percent of a binder resin based on the total weight of the composition, more preferably about 0 to about 5 percent based upon the total weight of the composition. Most preferably the composition is free of binder resin.

Binder resins are materials that form a continuous film that adheres to the substrate and holds together other substances in the coating to form a film. Known binders typically have a glass transition temperature of less than about 100 degrees C. Examples of known binders include but are not limited to those selected from the group consisting of acrylic, urethane, and epoxy polymers. Other examples of binders include silicones, polyesters, polystyrene, and fluoropolymers. If binders are included in the present invention, they would most likely be fluoropolymers or silicones.

Preparation of the Composition of the Invention

The composition of the invention can be prepared by combining the components in any order. Typically, the composition of the invention is prepared by charging the solvent into a suitable vessel, followed by antiloading agent, followed by pigment(s)/dye(s), and followed by any remaining materials. The pigment(s)/dye(s) are typically added slowly to avoid agglomeration. Agitation typically occurs throughout the preparation process.

Method of Use of the Composition of the Invention

The composition of the invention is typically spray applied onto the substrate to be sanded at a distance of about 12 to about 20 inches (30.5 cm to about 50.8 cm). The composition is preferably applied to the substrate with smooth overlapping strokes to produce an even coating.

Surface finishing processes, particularly repair processes in the automotive refinish industry, involve the application of fillers to imperfections in the surface followed by progressive abrasion with coarser to finer abrasive materials until the desired smooth surface is achieved. A series of protective coatings is applied, e.g., primer, sealers, base coats, clear coats, and so forth, and each layer is normally abraded prior to application of the next coat in order to ensure a smooth surface. A smooth surface is obtained by preferentially abrading high spots until a uniform, flat, aesthetically pleasing surface is obtained. As the surface is abraded the guide coat is removed from the higher portions of the surface leaving the visible guide coat on the lower areas. Thus, the surface irregularities are clearly visible to the operator: enabling the operator to abrade and fill the appropriate areas to achieve a flat high quality repair.

The guide coat composition of the invention is typically applied by spraying (most typically aerosol spraying) onto the desired substrate to distribute (preferably evenly distribute) the guide coat composition over the area to be sanded. The guide coat is allowed to dry. The area in which the guide coat has been applied can then be sanded. Upon drying, the composition is a solid dry coating with a thin layer of powdery residue on the surface. The composition of the invention is used in a dry sanding process.

Preferably the substrate to be sanded is selected from the group consisting of putty, primer, paint, wood, metal, plastic, and gelcoat.

Test Methods

The following test methods are used herein.

Viscosity Measurement of (non-aerosol composition)
1) Use RVF Brookfield Viscometer and RV Spindles.
2) Add 400 grams of composition to a half pint can.
3) Measure viscosity of composition at 75 degrees F. (+or −2) (24° C. +or −1.2).
4) Using Spindle #1 submerge in concentrate to line. Turn on viscometer at 20 rpm. Record the number after the $_{10}$th revolution.
Multiply number by appropriate factor (5) and record viscosity in centipoise.

Dry Time Composition (Non-aerosol)
1) 4"×12" (10×31 cm) unpolished cold roll steel panels were primed with PPG Industries K-200 two component polyurethane automotive refinish primer according to directions. The panels were cured for several weeks under ambient conditions before testing.
2) A 5 mil (0.0127 cm) film of the concentrate was cast over the primed panels using a square 4 inch (10.2 square cm) draw down bar #24 supplied by Precision Gauge and Tool Company. Next, 3 grams of concentrate was applied onto the panel with a dropper and drawn over the primed panel with the draw down bar. The film was allowed to volatilize at 75° F. (24° C.) without air circulation until the film was tack-free to the touch. This time was recorded as the tack-free time.

Dry Time (Aerosol):
1) Primed panels were prepared according to the directions above.
2) The product is spray applied to the 4"×12" (10.2×30.5 cm) primed panels at a distance of 12" from the panel by using a 50% overlap between passes in order to achieve a thin uniform coating. The valve used on the aerosol can was #186-27-16 supplied by Newman-Green, Inc. The film was allowed to volatilize at 75° F. (24° C.) without air circulation until the film was tack free to the touch. This time was recorded as the tack-free time.

EXAMPLES

The present examples further illustrate but do not limit the present invention. All parts, percentages, ratios, etc. in the examples are by weight unless indicated otherwise.

Uniformity Definition:

The following uniformity definitions are used herein.

Very Good Uniformity: The atomized spray droplets are of similar size and coat the substrate with minimal variation in coating thickness and color. A continuous coating is observed.

Fair Uniformity: The atomized spray pattern is mostly small droplets of similar size but also contains some larger droplets which can cause "Spitting" or "Pulsing". The resulting coating may vary in thickness and color intensity. The coating may not be continuous.

Poor Uniformity: The atomized spray pattern is a mixture of droplet sizes and may be difficult to dispense. The resulting coating is not continuous.

| Components | Example 1 (g) |
|---|---|
| Acetone | 75 |
| Zinc Stearate | 25 |
| Carbon Black (Elftex 8) | 4 |
| Propellant | 140 mls |

Preparation Procedure for Example 1:

First, 75 grams of acetone was added to a pint (473 ml) can and mixed with a dispersator (available from Premier Mill, Temple, Pa., U.S.A.) under slow speed. Next, 25 grams of zinc stearate antiloading was slowly added to the acetone until a homogenous mixture was obtained (about 1 minute). Next, 4 grams of carbon black pigment (Elfax 8 available from Cabot Corporation) was then added slowly to prevent agglomeration and stirred an additional 2 minutes. The mixture was then added to a standard 22 oz (650ml) aerosol can and charged with 140 milliliters of propane which was mixed in with the components in the can.

Spraying/Sanding Procedure I for Example 1 and Control 1

Example 1 was spray applied to a car door primed with refinish urethane primer (PPG K-200, available from PPG Industries) at a distance of 12 inches (30.5 cm). A second such car door was left unsprayed (Control 1). Each door was sanded within 15 seconds of application using a National Detroit Dual Action sander with 3M STIK-IT™ Gold 320 abrasive and 3M 5776 STIK-IT™ Disc Pad (both available from Minnesota Mining and Manufacturing Company) at 80 psi (0.55 megapascals) line pressure. Sanding began on the door sprayed with Example 1 within 15 seconds of application. Sanding results for Example 1 were then compared to those for Control 1 where no coating had been applied.

With respect to abrasive loading, the Control 1 abrasive disc was approximately 25% loaded with substrate residue as visually estimated from the used abrasive disc. The Control 1 displayed 3–4 times the level of abrasive disc loading when visually compared with the used abrasive disc used on the coating from the Example 1 aerosol system. From these results it can be concluded that the use of the Example 1 composition increased the life of the abrasive disk.

With respect to cut rate performance, it was visually determined that the coating prepared from Example 1 was abrading at about 2 times the rate of the Control 1 coating as indicated by the amount of substrate dust removed during the abrasion process. The cut rate performance for Control 1 quickly declined as evidenced by the reduction of sanding dust and the rate at which the surface was made flat and the defects removed.

With respect to guide coat performance it was visually determined that surface defects were easily seen during the sanding process with Example 1 that could not be visually detected when abrading the car door according to Control 1. Surface defects could not be readily distinguished for Control 1 due to the absence of any applied coloring matter. The above results showed that abrasive loading was minimal, and cut performance improved for Example 1 when compared to the Control 1. Very good guidecoat characteristics, allowing surface defects to be easily seen, were apparent with Example 1.

Spraying/Sanding Procedure II for Example 1 and Control 2

Example 1 was then used to quantify the increase in abrasive cut rate by sanding over basecoat/clearcoat painted panels supplied by ACT, Inc. when using the present invention compared to using no such composition (Control 2). Example 1 was first spray applied to the panel in uniform overlapping strokes at a distance of about 12 inches (30.5 cm) to evenly coat the panel with a thin layer of powdery residue, following the Spraying/Sanding Procedure I. Control 2 was an identical panel purchased from ACT, Inc. with no composition applied thereto. The clearcoat paint was DuPont 7103 clearcoat. A 3M STIK-IT™ Gold 320 abrasive disc was attached to a 3M 5776 STIK-IT™ Disc Pad and was again used on a National Detroit Dual Action Sander at 80 psi (0.55 megapascals).

The panels were weighed initially and then again after each of five 30 second sanding procedures to determine the aggressiveness and life of the abrasive by measuring the difference in weight of the panels. This difference is an indication of how much paint was removed and is considered a measurement of abrasive cut rate or aggressiveness. The Example 1 material was reapplied to the panel between each weighing by spray applying one coat of the aerosol composition at a distance of about 12 inches (30.5 cm) to uniformly coat the substrate surface. For Control 2, no composition was applied to the panel prior to or between sanding operations to simulate normal abrasive performance and sanding procedures.

| Sanding Step | Panel Weight Difference for Example 1 (grams) | Panel Weight Difference for Control 2 (grams) |
| --- | --- | --- |
| 1st | 2.75 | 2.4 |
| 2nd | 2.04 | 1.48 |
| 3rd | 1.8 | 0.88 |
| 4th | 1.5 | 0.62 |
| 5th | 1.68 | 0.54 |

Preparation, Spraying and Sanding/Examples 2, 3, and 4

Examples 2, 3, 4 were prepared using the same method as in the preparation of Example 1. First, the acetone was added to a pint (473 ml) can and mixed with a dispersator (available from Premier Mill, Temple, Pa., U.S.A.) under slow speed. Next, the zinc stearate was slowly added to the acetone until a homogeneous mixture was obtained (about 1 minute). Next the pigment was added slowly to prevent agglomeration and stirred an additional 2 minutes. The mixture was then added to a standard 22 oz (650 ml) aerosol can and charged with propellant which was intermixed with the other components in the can. The level of propane propellant was varied to help determine an optimum level for spray pattern uniformity and dry time.

| | Example 2 (g) | Example 3 (g) | Example 4 (g) |
| --- | --- | --- | --- |
| Acetone | 80 | 80 | 80 |
| Dye (Rose Bengale) | 0.75 | 0.75 | 0.75 |
| Zinc Stearate | 20 | 20 | 20 |
| Propane Propellant | 50 mls | 100 mls | 150 mls |

The procedure of Example 1 was followed when preparing the aerosol systems of Examples 2, 3, and 4, except for substitution of the dye type and component amounts.

The spraying/sanding procedure used was the same as that for Example 1. The samples were spray applied to a car door primed with refinish urethane primer that had been allowed to cure for several days (PPG K-200, available from PPG Industries) at a distance of about 12 inches (30.5 cm). A second such primed car door was left unsprayed (Control 1). Each door was sanded within 15 seconds of application using a National Detroit Dual Action sander with 3M STIK-IT™ Gold 320 abrasive and 3M 5776 STIK-IT™ Disc Pad (both available from Minnesota Mining and Manufacturing Company) at 80 psi (0.55 MPA) line pressure. Sanding began on the doors sprayed with Examples 2, 3, and 4 within 15 seconds of application. Sanding results for Examples 2, 3 and 4 were then compared to those for Control 1 where no coating had been applied.

The abrasive cut rate for Example 2 was the same as in Example 1. It was visually determined that the disk used with Example 2 was abrading at about 2 times the rate of the disk used with Control 1 as indicated by the amount of substrate dust removed during the abrasion process.

The uniformity for Example 2 was fair as determined by visual observation. The atomized spray pattern was mostly small droplets of similar size but also contained some larger droplets which caused "Spitting" and "Pulsing". The resulting coating varied in thickness and color intensity. The coating was not continuous.

The dry time for Example 2 was very good as determined by the coating being dry to the touch within 30 seconds from it being applied and ready for the sanding operation.

It was visually determined that the disk used with Example 3 was abrading at about 2 times the rate of the control as indicated by the amount of substrate dust removed during the abrasion process.

The uniformity for the Example 3 coating was very good as determined visually. The atomized spray droplets were of similar size and coated the substrate with minimal variation in coating thickness and color. A continuous coating was observed.

The dry time for Example 3 was very good as determined by the coating being dry to the touch within 30 seconds from it being applied and ready for the sanding operation.

It was visually determined that Example 4 was abrading at about 2 times the rate of the Control 1 as indicated by the amount of substrate dust removed during the abrasion process.

The uniformity for Example 4 was very good as determined visually. The atomized spray droplets were of similar size and coated the substrate with minimal variation in coating thickness and color. A continuous coating was observed.

The dry time for Example 4 was very good as determined by the coating being dry to the touch within 30 seconds from it being applied and ready for the sanding operation.

Rose Bengale was a bright distinguishing color that improved visual identification of defects compared to carbon black of Example 2.

Preparation/Spraying/Sanding Procedure for Examples 5 and 6

Example 5 was prepared by first combining 100 grams of Example 2 (prior to adding propellant to Example 2) with 100 grams of acetone. Next, 200 grams of the mixture was added to a 22 oz (650 ml) aerosol can and charged with 150 mls of propane propellant.

Example 6 was prepared by combining 100 grams of Example 2 (prior to adding propellant to Example 2) with 100 grams of isopropanol. 200 grams of the mixture was added to a 22 oz (650 ml) aerosol can and charged with 150 mls of propellant.

Example 5 and 6 were each spray applied as in Examples 2, 3, and 4 to a car door primed with refinish urethane primer that had been allowed to cure for several days (PPG K-200, available from PPG Industries) at a distance of about 12 inches (30.5 cm). An additional car door was left unsprayed (Control 1). Each door was sanded within 15 seconds of application using a National Detroit Dual Action sander with 3M STIK-IT™ Gold 320 abrasive and 3M 5776 STIK-IT™ Disc Pad (both available from Minnesota Mining and Manufacturing Company) at 80 psi (0.55 megapascals) line pressure.

Examples 5 and 6 displayed good sanding properties and guide coat characteristics with a lower level of airborne stearate dust than for Examples 2, 3, and 4, by visual observations. Both Examples 5 and 6 had good dry times and uniformity. (It was thought that Example 5 may dry too fast and so isopropanol was used in place of acetone due to its slower evaporation rate). Example 6 was preferred over Example 5 due to its combination of uniform spray application and drying time.

|  | Example 5 (g) | Example 6 (g) |
| --- | --- | --- |
| Example 2 | 100 | 100 |
| Acetone | 100 | 0 |
| Isopropanol | 0 | 100 |

It was visually determined that Example 5 was abrading at about 2 times the rate of the Control 1 as indicated by the amount of substrate dust removed during the abrasion process.

The uniformity for Example 5 was Fair. The atomized spray pattern was mostly small droplets of similar size but also contained some larger droplets which caused "Spitting" and "Pulsing". The resulting coating varied in thickness and color intensity thickness and color. A continuous coating was observed.

The dry time for Example 5 was very good as determined by the coating being dry to the touch within 30 seconds from it being applied and ready for the sanding operation.

It was visually determined that Example 6 was abrading at about 2 times the rate of the Control 1 as indicated by the amount of substrate dust removed during the abrasion process.

The uniformity for Example 6 was Very Good. The atomized spray droplets were of similar size and coated the substrate with minimal variation in coating thickness and color. A continuous coating was observed.

The dry time for Example 6 was very good as determined by the coating being dry to the touch within 30 seconds from it being applied and ready for the sanding operation.

The effect of Example 6 on the sanding efficiency of three different grades of abrasive paper was determined. Example 6 was used to quantify the increase in abrasive cut rate by sanding over basecoat/clearcoat painted panels supplied by ACT, Inc. The clearcoat paint was DuPont 7103 clearcoat. 3M STIK-IT™ Gold 320 abrasive and a 3M 5776 STIK-IT™ Disc Pad were used on a National Detroit Dual Action Sander at 80 psi. (0.55 megapascals).

The panels were weighed initially and then again after each 30 second sanding procedure to determine the aggressiveness and life of the abrasive by measuring the difference in weight of the substrate. These values are recorded below along with the total amount of paint removed after 5 applications.

| | | Grams Removed Per Sanding Step | | | | | |
| --- | --- | --- | --- | --- | --- | --- | --- |
| Abrasive Grade | Example 6 | $1^{st}$ | $2^{nd}$ | $3^{rd}$ | $4^{th}$ | $5^{th}$ | Total Grams Removed |
| 80 Grade | Yes | 3.44 | 3.65 | 3.62 | 3.4 | 3.77 | 17.88 |
|  | No | 2.86 | 3.19 | 3.08 | 3.02 | 3.03 | 15.18 |
| 320 Grade | Yes | 2.67 | 2.07 | 1.79 | 1.61 | 1.51 | 9.65 |
|  | No | 2.31 | 1.42 | 0.89 | 0.63 | 0.46 | 5.71 |
| 1000 Grade | Yes | 0.66 | 0.49 | 0.3 | 0.21 | 0.17 | 1.83 |
|  | No | 0.44 | 0.28 | 0.14 | 0.13 | 0.08 | 1.07 |

The data in the table above demonstrate the dramatic increase in abrasive cut rate leading to significant time savings in achieving a defect-free flat finish. It also shows that abrasive disc life is extended leading to lower cost of abrasion operations.

In the table above, "yes" means that the inventive composition was applied to each of the individual panels between each weight measurement and sanding procedure to determine if abrasive cut and life were improved. "No" means that the composition was not used with a similar panel between sanding to demonstrate the abrasive performance without the inventive composition.

Various modifications and alterations of this invention will become apparent to those skilled in the art without departing from the scope and spirit of this invention, and it should be understood that this invention is not to be unduly limited to illustrative embodiments set forth herein.

It is claimed:

1. A composition comprising:
   (a) a solvent(s) having an evaporation rate of at least about 0.5 when measured at a temperature of 25° C., wherein if more than one solvent is used, the solvents are miscible with each other;
   (b) at least about 0.001 percent by weight of a component selected from the group consisting of solvent dispersible pigments, solvent soluble dyes, and mixtures thereof; and
   (c) at least about 1 percent by weight of an antiloading agent(s);
   wherein the weight percentages are based upon the total weight of the composition, and wherein the composition has a Brookfield viscosity of less than about 15,000 centipoise, and
   wherein the composition is capable of drying within five minutes or less upon coating on a substrate.

2. The composition of claim 1 which comprises about 0 to about 10 weight percent of a binder resins based on the total weight of the composition.

3. The composition of claim 1 which is free of binder resin.

4. The composition of claim 1 wherein the composition has a Brookfield viscosity of about 10 to about 8,000 centipoise.

5. The composition of claim 1 wherein the composition has a Brookfield viscosity of about 15 to about 5,000 centipoise.

6. The composition of claim 1 wherein the composition has a Brookfield viscosity of about 20 to about 2,500 centipoise.

7. The composition of claim 1 which is capable of drying in about three minutes or less upon coating on a substrate.

8. The composition of claim 1 which is capable of drying in about one minute or less upon coating on a substrate.

9. The composition of claim 1 which is capable of drying in about thirty seconds or less upon coating on a substrate.

10. The composition of claim 1 wherein the antiloading agent(s) is selected from the group consisting of metallic stearates, metallic oleates, metallic octoates, and mixtures thereof.

11. The composition of claim 1 wherein the antiloading agent(s) is selected from the group consisting of zinc stearate, calcium stearate, magnesium stearate, iron stearate, copper stearate, lithium stearate, sodium stearate, strontium stearate, aluminum stearate, barium stearate, potassium stearate, sodium oleate, aluminum octoate, and mixtures thereof.

12. The composition of claim 1 wherein the antiloading agent is zinc stearate.

13. The composition of claim 1 wherein the component of (b) is a solvent soluble dye(s).

14. The composition of claim 1 wherein the solvent soluble dye(s) is selected from the group consisting of diphenylmethanes, triphenylmethanes, acridines, xanthenes, quinonimines, azines, oxazines, methylene, carotinoids, carbonyl, indigo, anthraquinone, stilbene, sulfur, and mixtures thereof.

15. The composition of claim 1 wherein the solvent(s) is selected from the group consisting of aliphatic hydrocarbons, aromatic hydrocarbons, chlorinated versions of the aforementioned, and mixtures thereof.

16. The composition of claim 1 wherein the solvent(s) is selected from the group consisting of ketones, alcohols, esters, chlorinated versions of the aforementioned, and mixtures thereof.

17. The composition of claim 1 wherein the solvent(s) is selected from the group consisting of acetone, isopropanol, hexane, cyclohexane, toluene, methane, ethanol, methyl ethyl ketone, isobutylketone, heptane, and mixtures thereof.

18. A composition comprising:
(a) about 60 to about 99 percent by weight of a solvent(s) having an evaporation rate of at least about 0.5 to about 20 at a temperature of 25 degrees C., wherein if more than one solvent is used, the solvents are miscible with each other;
(b) about 0.01 to about 20 percent by weight of a component selected from the group consisting of solvent dispersible pigments, solvent soluble dyes, and mixtures thereof; and
(c) about 1 to about 50 percent by weight of an antiloading agent,
wherein the weight percentages are based upon the total weight of the composition, and wherein the composition has a Brookfield viscosity of about 10 to about 8,000 centipoise, and wherein the composition is capable of drying within five minutes or less upon coating on a substrate.

19. A composition comprising:
(a) about 70 to about 95 percent by weight of a solvent(s) having an evaporation rate of about 3 to about 15 when measured at a temperature of 25° C., wherein if more than one solvent is used, the solvents are miscible with each other;
(b) about 0.1 to about 10 percent by weight of a component selected from the group consisting of solvent dispersible pigments, solvent soluble dyes, and mixtures thereof; and
(c) about 5 to about 30 percent by weight of an antiloading agent,
wherein the weight percentages are based upon the total weight of the composition, and wherein the composition has a Brookfield viscosity of about 15 to about 5,000 centipoise, and wherein the composition is capable of drying within five minutes or less upon coating on a substrate.

20. A composition comprising:
(a) about 80 to about 90 percent by weight of a solvent(s) having an evaporation rate of about 7 to about 10 when measured at a temperature of 25° C., wherein if more than one solvent is used, the solvents are miscible with each other;
(b) about 0.1 to about 5 percent by weight of a component selected from the group consisting of solvent dispersible pigments, solvent soluble dyes, and mixtures thereof;
(c) about 10 to about 20 percent by weight of an antiloading agent,
wherein the weight percentages are based upon the total weight of the composition, and wherein the composition has a Brookfield viscosity of about 20 to about 2,500 centipoise, and wherein the composition is capable of drying within five minutes or less upon coating on a substrate.

* * * * *

UNITED STATES PATENT AND TRADEMARK OFFICE
CERTIFICATE OF CORRECTION

PATENT NO.: 5,853,467

DATED: December 29, 1998

INVENTOR(S): Ostlie

It is certified that error appears in the above-identified patent and that said Letters Patent is hereby corrected as shown below:

Title page, item [56],

Under "U.S. Patent Documents" The reference Patent No. --4,797,440  01/1989 Schofield et al. 524/239 -- should be added.

Signed and Sealed this

Thirtieth Day of November, 1999

Attest:

Attesting Officer

Q. TODD DICKINSON

Acting Commissioner of Patents and Trademarks